US010708299B2

(12) United States Patent
Pan

(10) Patent No.: US 10,708,299 B2
(45) Date of Patent: Jul. 7, 2020

(54) MITIGATING EFFECTS OF FLOODING ATTACKS ON A FORWARDING DATABASE

(71) Applicant: Fortinet, Inc., Sunnyvale, CA (US)

(72) Inventor: Yixin Pan, Burnaby (CA)

(73) Assignee: Fortinet, Inc., Sunnyvale, CA (US)

(*) Notice: Subject to any disclaimer, the term of this patent is extended or adjusted under 35 U.S.C. 154(b) by 216 days.

(21) Appl. No.: 16/008,265

(22) Filed: Jun. 14, 2018

(65) Prior Publication Data

US 2019/0289033 A1 Sep. 19, 2019

Related U.S. Application Data

(63) Continuation-in-part of application No. 15/925,249, filed on Mar. 19, 2018.

(51) Int. Cl.
G06F 21/00 (2013.01)
H04L 29/06 (2006.01)
H04L 12/743 (2013.01)

(52) U.S. Cl.
CPC ...... *H04L 63/1458* (2013.01); *H04L 45/7453* (2013.01); *H04L 63/0227* (2013.01); *H04L 63/0272* (2013.01); *H04L 63/1416* (2013.01); *H04L 63/1425* (2013.01); *H04L 63/20* (2013.01)

(58) Field of Classification Search
None
See application file for complete search history.

(56) References Cited

U.S. PATENT DOCUMENTS

| 6,538,990 | B1* | 3/2003 | Prorock ............ H04L 49/50 370/229 |
| 2002/0194373 | A1* | 12/2002 | Choudhry ........... H04L 29/06 709/242 |
| 2005/0163115 | A1 | 7/2005 | Dontu et al. |
| 2008/0028445 | A1 | 1/2008 | Dubuc et al. |
| 2013/0107889 | A1 | 5/2013 | Barabash et al. |
| 2013/0298201 | A1* | 11/2013 | Aravindakshan ... H04L 63/0272 726/4 |
| 2014/0086253 | A1 | 3/2014 | Yong |
| 2014/0146817 | A1 | 5/2014 | Zhang |

(Continued)

OTHER PUBLICATIONS

Non-Final Office Action for U.S. Appl. No. 16/008,800, dated Feb. 18, 2020, 28 pages.

*Primary Examiner* — Maung T Lwin
(74) *Attorney, Agent, or Firm* — Jaffery Watson Mendonsa & Hamilton LLP

(57) ABSTRACT

Systems and methods for mitigating effects of source-Media Access Control (MAC) flooding attacks on a forwarding database (FDB) that maps MAC addresses to enhanced MAC Virtual Local Area Network (EMACVLAN) sub-interfaces of a physical Ethernet interface are provided. A Virtual Domain (VDOM) operating in transparent mode receives an ingress packet by an internal switch running on the virtualized network device via a sub-interface. When an entry, corresponding to a source MAC address of the ingress packet, does not exist in the FDB, an appropriate entry is created in the FDB and the entry is queued for confirmation at a tail of an ephemeral queue. When a total number of entries contained in the FDB reaches a predetermined threshold, an unconfirmed entry at a head of the queue is removed from the FDB. When the entry is confirmed, it is retained in the FDB and is unlinked from the queue.

14 Claims, 14 Drawing Sheets

(56) References Cited

U.S. PATENT DOCUMENTS

| | | |
|---|---|---|
| 2014/0214761 A1 | 7/2014 | Leake et al. |
| 2014/0244851 A1 | 8/2014 | Lee |
| 2015/0032691 A1 | 1/2015 | Hall et al. |
| 2015/0207723 A1 | 7/2015 | Cors et al. |
| 2015/0358232 A1 | 12/2015 | Chen et al. |
| 2016/0301608 A1* | 10/2016 | Natarajan ............... H04L 45/54 |
| 2017/0033992 A1 | 2/2017 | Dichtel et al. |
| 2017/0093834 A1* | 3/2017 | Natu ................... H04L 45/745 |

* cited by examiner

```
#define MACVLAN_MAX_NUM       512
#define MACVLAN_HASH_SIZE     (1 << 8)
#define MACVLAN_HASH_MASK     (MACVLAN_HASH_SIZE - 1)
struct macvlan_port {
    struct net_device   *dev;/* point to the object of lower interface */
    int                 count;/* 0 to MACVLAN_MAX_NUM */
    unsigned long       bitmap[BITS_TO_LONGS(MACVLAN_MAX_NUM)];

spinlock_t          macvlan_mac_lock;
    int                 mac_num;
    struct hlist_head   mac_hash[MACVLAN_HASH_SIZE];
    struct timer_list   mac_gc_timer;

```
struct macvlan_port {
    ... ...
    int                 mac_num;
    struct hlist_head   mac_hash[MACVLAN_HASH_SIZE];
    struct list_head    mac_ephemeral_list;
    struct timer_list   mac_gc_timer;
    ... ...
};
```

FIG. 5B

```
struct macvlan_dev {
    struct net_device   *dev;/* point to "struct net_device" object of EMACVLAN sub-interface. */
    struct macvlan_port *port;  /* point to "struct macvlan_port" object of lower interface. */ unsigned short      macvlan_id;
    unsigned int        learn_mac:1;

```
#define MACVLAN_FDB_T_LOCAL         0x01
#define MACVLAN_FDB_T_STATIC        0x02
define MACVLAN_FDB_T_DYNAMIC       0x04 struct macvlan_fdb_entry {
    struct hlist_node    hash_link;

struct macvlan_dev   *macdev;       /* specify the bound interface */
    unsigned char        mac_addr[ETH_ALEN];
    unsigned char        mac_type;
    unsigned long        last_used;

```
struct macvlan_fdb_entry {
    struct list_head     eph_link;
    struct hlist_node    hash_link;

struct macvlan_dev   *macdev;    /* specify the bound interface */
    unsigned char        mac_addr[ETH_ALEN];

MITIGATING EFFECTS OF FLOODING ATTACKS ON A FORWARDING DATABASE

CROSS-REFERENCE TO RELATED PATENTS

This application is a continuation-in-part of U.S. patent application Ser. No. 15/925,249, filed Mar. 19, 2018, which is hereby incorporated by reference in its entirety for all purposes. Contained herein is material that is subject to copyright protection.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright©2018, Fortinet, Inc.

BACKGROUND

Field

Embodiments of the present invention generally relate to the field of Virtual Local Area Networks (VLANs), and more particularly relate to prevention of source Media Access Control (MAC)-flooding attacks in the context of a virtualized network security appliance in which a physical Ethernet interface is configured with enhanced MAC VLAN (EMACVLAN) sub-interfaces to facilitate communication between applications within virtual domains and external network devices.

Description of the Related Art

A Local Area Network (LAN) provides networking capability and communication links to various workstations and computing devices. Generally, LANs are built to enable sharing of resources and services such as files, printers, applications, software, internet access, and the like. Modern LANs are predominantly based on Wi-Fi or Ethernet for interconnection of computing devices. A Wi-Fi-based LAN implements one or more wireless access points that manage network traffic flowing to and from the computing devices. An Ethernet based LAN, on the other hand, consists of one or more hubs, switches, or routers that are connected to computing devices through Ethernet cables.

A Virtual Local Area Network (VLAN) enables logical grouping of workstations, computing devices and various network devices that appear to be on the same LAN. Implementation of a VLAN provides scalability and security with ease of network management and can enable seamless adaption to changes in network requirements and relocation of workstations and computing devices.

As discussed further below with reference to FIG. 2, in existing VLAN architectures, when virtual domains (VDOMs) or virtual firewalls of a virtualized network security appliance need to communicate with one or more external network devices, such as an outside router that is not on the VLAN, the use of an intermediate front-end transparent (TP) VDOM is required to be logically interposed between the virtual firewalls and the physical Ethernet interface of the virtualized network security appliance coupled to the external network. Such use of the TP VDOM does not support High Availability (HA) active-active (AA) mode, and, in HA active-passive (AP) mode that requires all related virtual firewalls to be in a single virtual cluster. Use of the intermediate TP VDOM to enable communication between the VDOMs and external network devices also requires interfaces to be defined between each of the VDOMs and the TP VDOM, which results in the establishment of two sessions for each traffic flow thereby reducing the maximum number of concurrent sessions to half of its normal setup. Also, in such existing architectures, as each packet traverses the system twice, the systems' throughput is degraded.

There is therefore a need for an improved VLAN architecture that overcomes the above-mentioned and other disadvantages associated with use of TP VDOM as a means to connect with external network devices.

SUMMARY

Systems and methods are described for mitigating effects of source-MAC flooding attacks on a forwarding database (FDB) that maps MAC addresses to EMACVLAN sub-interfaces of a physical Ethernet interface. According to one embodiment, a VDOM operating in transparent mode receives an ingress packet an internal switch running on the virtualized network device via the sub-interface. When an entry, having a MAC address corresponding to a source MAC address of the ingress packet, does not exist in FDB: an entry containing the source MAC address and information regarding the sub-interface is created in FDB and the entry is queued for confirmation at a tail of an ephemeral queue. When a total number of entries contained in FDB reach a predetermined threshold, an unconfirmed entry at a head of ephemeral queue is removed from FDB. When the entry is recognized as a confirmed entry, the entry is retained in FDB and is unlinked from ephemeral queue.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIGS. 5A-C are code fragments illustrating exemplary implementation details relating to sub-interface creation in accordance with an embodiment of the present invention.

FIGS. 7A-B are code fragments illustrating exemplary data structures for forwarding database entry in accordance with an embodiment of the present invention.

DETAILED DESCRIPTION

Figure 1A:
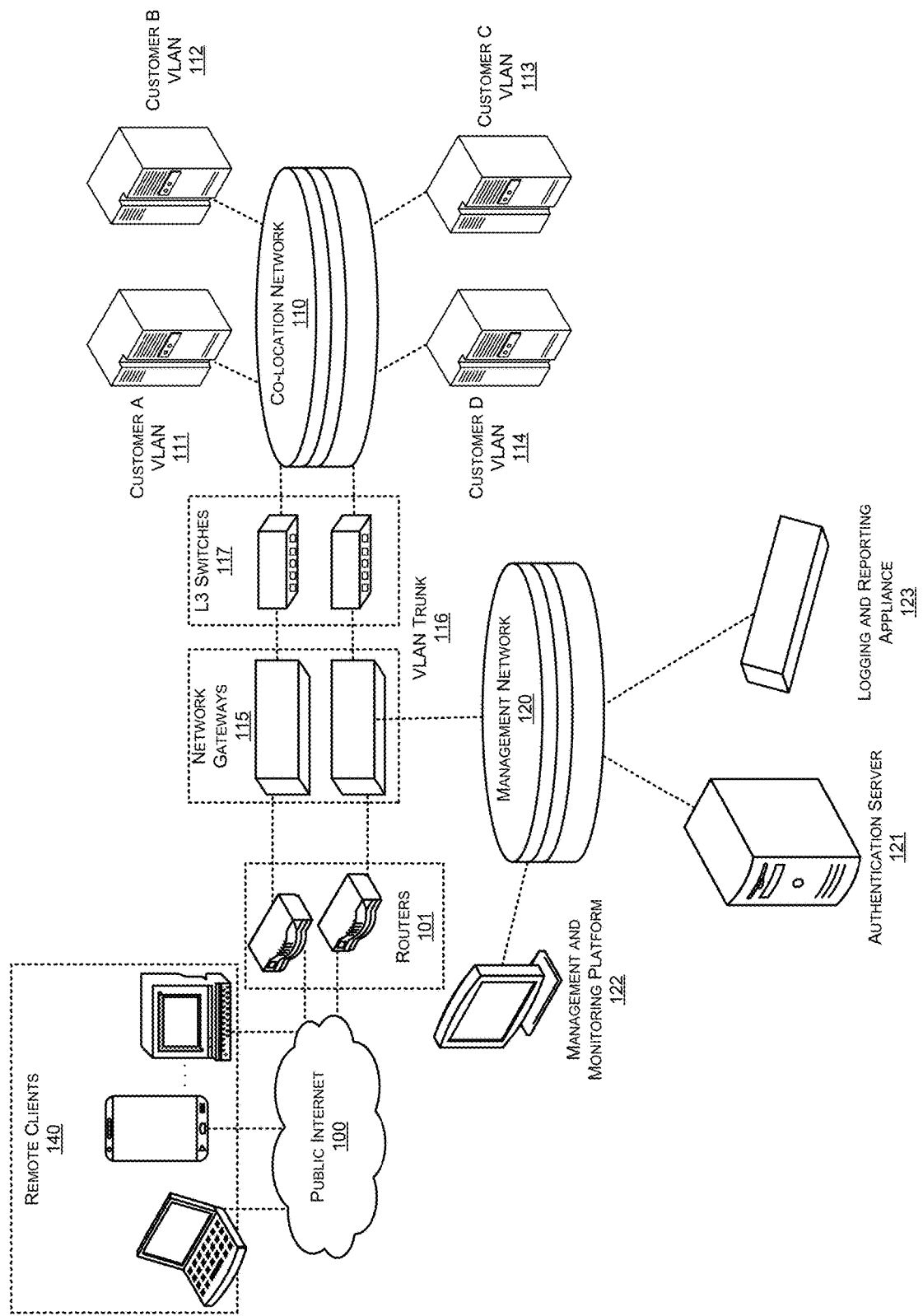
FIGS. 1A and 1B illustrate exemplary usage models for virtual domains (VDOMs) in Virtual Local Area Network (VLAN) architectures in accordance with an embodiment of the present invention.

Systems and methods are described for mitigating effects of source-MAC flooding attacks on a forwarding database (FDB) that maps MAC addresses to EMACVLAN sub-interfaces of a physical Ethernet interface. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but are not limited to, simple packet forwarding, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTI-WEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI-WIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The phrase "security device" generally refers to a hardware or virtual device or network appliance that provides security services to a private network, for example, providing one or more of data privacy, protection, encryption and security. A network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

The phrase "virtual domain" or the acronym VDOM generally refer to a method of dividing a single physical network security device (e.g., a UTM appliance) into two or more virtual units that function as multiple independent units. In the context of a UTM appliance, each VDOM can provide completely separate firewalling, routing, UTM, VPN, and next generation firewall services on behalf of multiple customers or multiple departments of an enterprise, for example.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

Systems and methods are described for mitigating effects of source-MAC flooding attacks on a FDB that maps MAC addresses to EMACVLAN sub-interfaces of a physical Ethernet interface. Embodiments of the present invention provide a VLAN architecture that allows configuration of sub-interfaces of a physical Ethernet interface where an internal switch maintains a MAC address table or a database to map the sub-interfaces to source MAC addresses. When traffic passes through a sub-interface working in a transparent-mode Virtual Domain (VDOM), the internal switch learns and saves the pair of source MAC address and sub-interface into a forwarding database (FBD). When the internal switch receives a data packet from an external network device, the internal switch performs a lookup in the FDB based on the destination MAC address contained in the data packet in order to forward the data packet to the appropriate sub-interface. This FDB learning approach is susceptible to source-MAC flooding attacks, in which an attacker sends a number of packets, each having a different source MAC address, resulting in junk entries being created in the FDB that could fill the FDB and obsolete valid entries such that normal traffic is not forwarded correctly, there is a need for the FDB to protect itself against such attacks. As such, according to various embodiments of the present disclosure, the effects of source-MAC flooding attacks are mitigated by maintaining an ephemeral queue simultaneously with maintenance of the FDB associated with a virtualized network device such that when entries are confirmed in the ephemeral queue, they are unlinked from the ephemeral queue but are retained in the FDB. Conversely, entries that have remained in the ephemeral queue for a long time (e.g., beyond a predefined/configurable time) are deleted from the FDB. Thus, during a source-MAC flooding attack, junk entries or stale entries can be removed from the FDB, such that normal traffic can be forwarded correctly.

An aspect of the present disclosure pertains to a method that can include facilitating, by a virtualized network device, communication between an application associated with a first virtual domain (VDOM) of the virtualized network device and an external network device by: creating a sub-interface of a physical Ethernet interface of the virtualized network device; assigning a unique Media Access Control (MAC) address to the sub-interface; and binding the application to the sub-interface; when the first VDOM is operating in transparent mode and an ingress packet to be processed by the application is received by an internal switch running on the virtualized network device via the sub-interface, then performing source-MAC learning while mitigating against a source-MAC flooding attack by: when an entry, having a MAC address corresponding to a source MAC address of the ingress packet, does not exist in an FDB of the virtualized network device: causing, by the internal switch, the FDB of the virtualized network device to learn an association between the source MAC address and the sub-interface by creating the entry containing the source MAC address and information regarding the sub-interface and storing the entry in the FDB; queuing, by the internal switch, the entry for confirmation at a tail of an ephemeral queue associated with the physical Ethernet interface; and when a total number of entries contained in the forwarding database reaches a predetermined threshold, then obsoleting, by the internal switch, an unconfirmed entry at a head of the ephemeral queue by removing the unconfirmed entry from the FDB; and when a packet is observed, by the internal switch, having a destination MAC address matching the MAC address of an entry awaiting confirmation in the ephemeral queue, then recognizing the entry awaiting confirmation as a confirmed entry for retention in the FDB and unlinking the confirmed entry from the ephemeral queue.

In an embodiment, storing the entry in the FDB can include hashing the entry by the unique MAC address of the sub-interface and storing the entry in a forwarding hash table.

In an embodiment, the method can further include periodically obsoleting stale entries in the FDB by responsive to expiration of a timer, removing entries, if any, from the FDB that have not been used for a predetermined amount of time.

In an embodiment, wherein the assigning the unique MAC address to the sub-interface can include generating the unique MAC address based on a MAC address of the physical Ethernet interface and a locally unique identifier of the sub-interface.

In an embodiment, the physical Ethernet interface can include any or a combination of an aggregate interface and a Virtual Local Area Network (VLAN) interface.

In an embodiment, the application can perform a network security function, including one or more of firewalling, web content filtering, antivirus scanning and intrusion prevention.

In an embodiment, the virtualized network device can include a virtualized network security device, and the FDB can be maintained within a kernel of a network security operating system of the virtualized network security device.

Figure 1B:
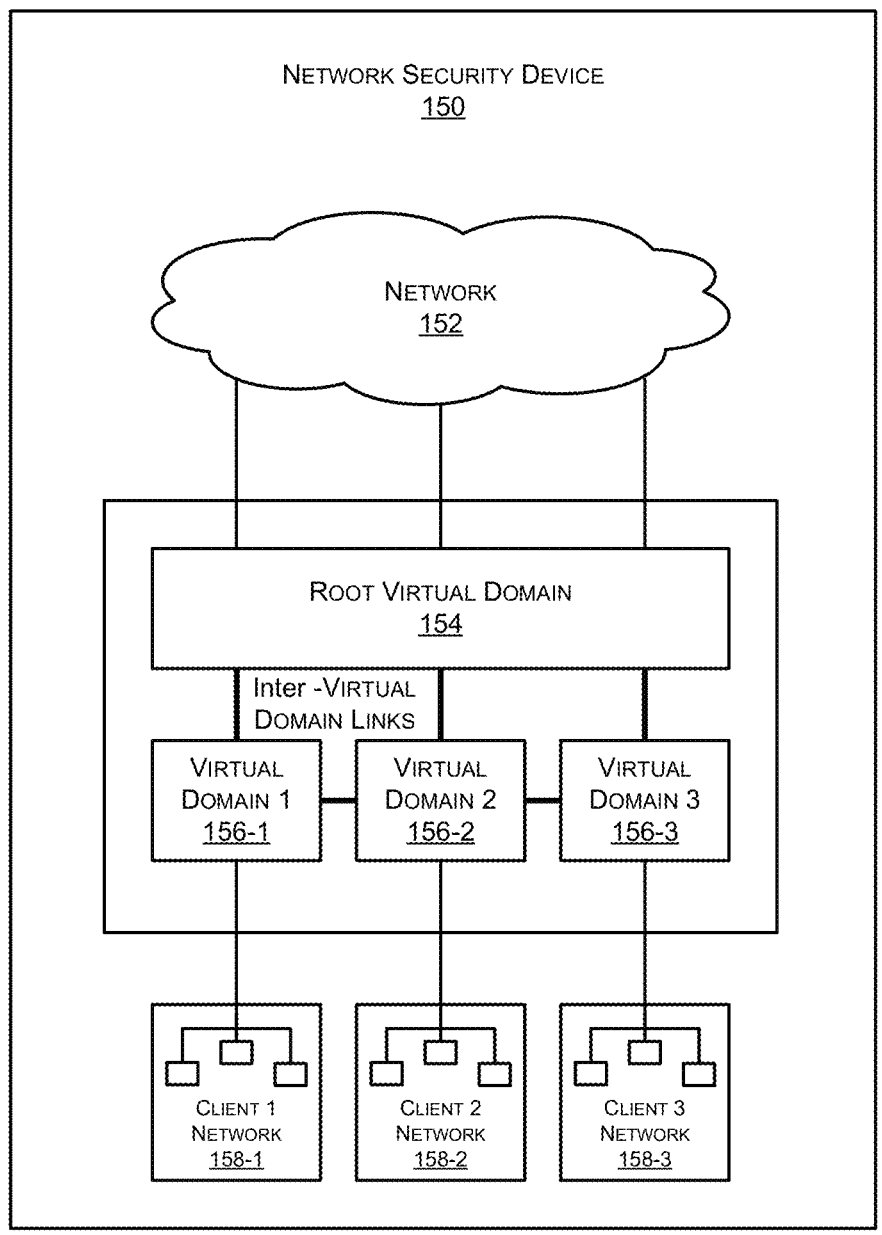

FIGS. 1A and 1B illustrate exemplary usage models for virtual domains (VDOMs) in Virtual Local Area Network (VLAN) architectures in accordance with an embodiment of the present invention.

According to the example architecture as illustrated in FIG. 1A, a co-location network 110 can be communicatively coupled with an external network (e.g., public Internet 100) through one or more intermediate networking devices, such as routers 101, network gateways 115 and layer 3 (L3) switches 117. Each entity can have a corresponding virtual local area network (VLAN), for example, Customer A VLAN 111, Customer B VLAN 112, Customer C VLAN 113 and Customer D VLAN 114 with which the customer's telecommunications and/or network equipment can be associated. Consequently, end users of an entity can access the pubic Internet 100 from their respective VLANs by way of the intermediate devices or end users may access various services and data provided by co-location network 110 by way of remote clients 140 connected to the public Internet 100. Network gateways 115 represent network security devices (e.g., one of the FORTIGATE family of multi-threat security systems or Enterprise Series antivirus firewalls).

According to an embodiment, co-location network 110 can be managed using a management network 120. Management network 120 can include an authentication server 121, a management and monitoring platform 122 and a logging and reporting appliance 123. Authentication server 121 can include a database supplemented to include information intended to be used to facilitate routing of subscriber traffic flows by network gateways 115 to appropriate VLANs. In one embodiment, an authentication database may be augmented to include a VLAN name, a Virtual Domain (VDOM) name and/or an interface name that can be used by network gateways 115 to identify an appropriate physical interface onto which to forward traffic of an authenticated end user. In alternative embodiments, authentication may be performed by various other means, including, but not limited to a directory access protocol-based authentication protocol, such as Lightweight Directory Access Protocol (LDAP), a Terminal Access Controller Access Control System (TACACS) authentication protocol, such as Terminal Access Controller Access Control System (TACACS), extended TACACS (XTACACS), TACACS+ or a successor to RADIUS, such as Diameter.

Management and monitoring platform 122 can provide a central management solution for deploying, provisioning, configuring, maintaining and otherwise managing and monitoring of network gateways 115 and resources associated with co-location network 110. In one embodiment, management and monitoring platform 112 can include a FORTIMANAGER management and monitoring platform available from Fortinet, Inc. of Sunnyvale, Calif.

Further, logging and reporting appliance 123 can log, gather, correlate, analyze and store event data from across the co-location network architecture and provides a reporting architecture that can facilitate report creation. The reporting capabilities of logging and reporting appliance 123 can encompass many types of traffic including one or more of network, Web, FTP, Terminal, Mail, Intrusion, Antivirus, Web Filter, Mail Filter, VPN and Content. Logging and reporting appliance 123 can also provide advanced logging with meta content logs to facilitate with regulatory compliance, such as the Health Insurance Portability and Accountability Act (HIPAA) and Sarbanes-Oxley (SOX), by allowing high-level monitoring of HTTP, FTP, IMAP, POP3 and SMTP traffic from network gateways 115 and/or resources associated with co-location network 110. In one embodiment, logging and reporting appliance 123 comprises one of the FORTIANALYZER family of real-time network logging, analyzing and reporting systems available from Fortinet, Inc. of Sunnyvale, Calif.

According to the architecture illustrated in FIG. 1B, a root VDOM 154 that can be a physical domain can have access to the external network 152 or the public Internet. The physical domain can be split into virtual domains such as VDOM 156-1, VDOM 156-2 and VDOM 156-3. Root VDOM 154 can represent a management VDOM and other VDOMs (156-1, 156-2, 156-3) can be connected to root VDOM 154 with inter-virtual VDOM links. Therefore, VDOMs (156-1, 156-2, 156-3) can rely on root VDOM 154 for Internet access or communication with external network 152. Each VDOM (156-1, 156-2, 156-3) can have its own specific configuration and management interfaces, VLANs, zones, firewall policies, routing and VPNs.

In an example, multiple interfaces can be added to a VDOM (156-1, 156-2, 156-3) by combining the multiple interfaces into a hardware switch interface of a VLAN. The hardware switch interface of a VLAN can be treated as a single interface by network security device 150. For example, client network 158-1 can be added to VDOM 156-1, client network 158-2 can be added to VDOM 156-2, and client network 158-3 can be added to VDOM 156-3.

Figure 2:
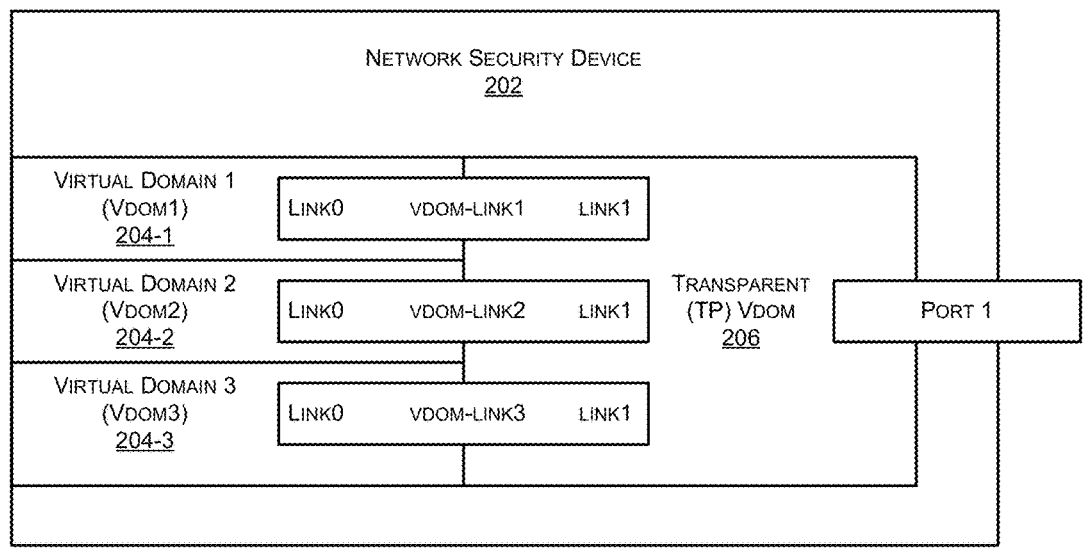
FIG. 2 is a simplified block diagram conceptually illustrating a prior art technique for enabling communications between one or more virtual domains and an external network device.

FIG. 2 is a simplified block diagram conceptually illustrating a prior art technique for enabling communications between one or more virtual domains and an external network device. As illustrated in FIG. 2, in existing VLAN architectures, when virtual domains or virtual firewalls (which may be collectively referred to as VDOMs 204 herein) of a virtualized network security device 202 need to communicate with one or more external network devices, such as an outside router that is not on the VLAN, the use of an intermediate front-end transparent (TP) VDOM 206 is required to be logically interposed between VDOMS 204 and the physical Ethernet interface (e.g., Port 1) of virtual network security device 202 coupled to the external network. Such use of the TP VDOM 206 does not support High Availability (HA) active-active (AA) mode. Also, use of TP VDOM 206 in HA active-passive (AP) mode requires that all related VDOMs be in one virtual cluster. Further, use of intermediate TP VDOM 206 to enable communication between VDOMs 202 and external network devices also requires intermediate interfaces (e.g., VDOM-Link1, VDOM-Link 2 and VDOM-Link3) to be defined between each of the VDOMs 204 and TP VDOM 206, which results in the establishment of two sessions for each traffic flow thereby reducing the maximum number of concurrent sessions to half of its normal setup. Also, in such existing architectures, as each packet traverses the system twice, the throughput of the system is degraded.

Figure 3:
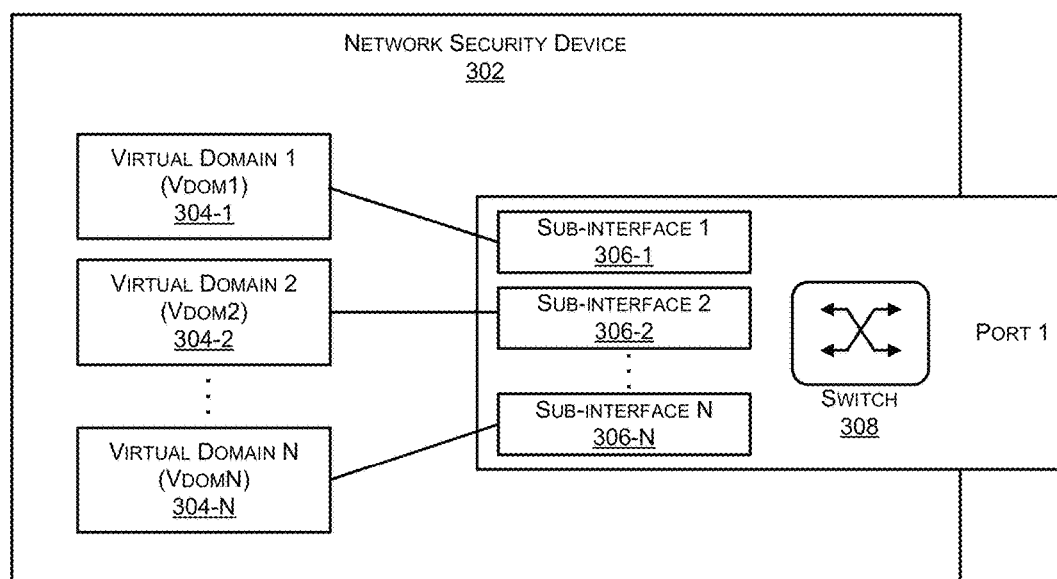
FIG. 3 is a simplified block diagram conceptually illustrating the use of enhanced media access control (MAC) VLAN (EMACVLAN) sub-interfaces to facilitate more efficient communication between one or more virtual domains and an external network device in accordance with an embodiment of the present invention.

FIG. 3 is a simplified block diagram 300 conceptually illustrating the use of enhanced media access control (MAC) VLAN (EMACVLAN) sub-interfaces to facilitate more efficient communication between one or more virtual domains and an external network device in accordance with an embodiment of the present invention.

Figure 4:
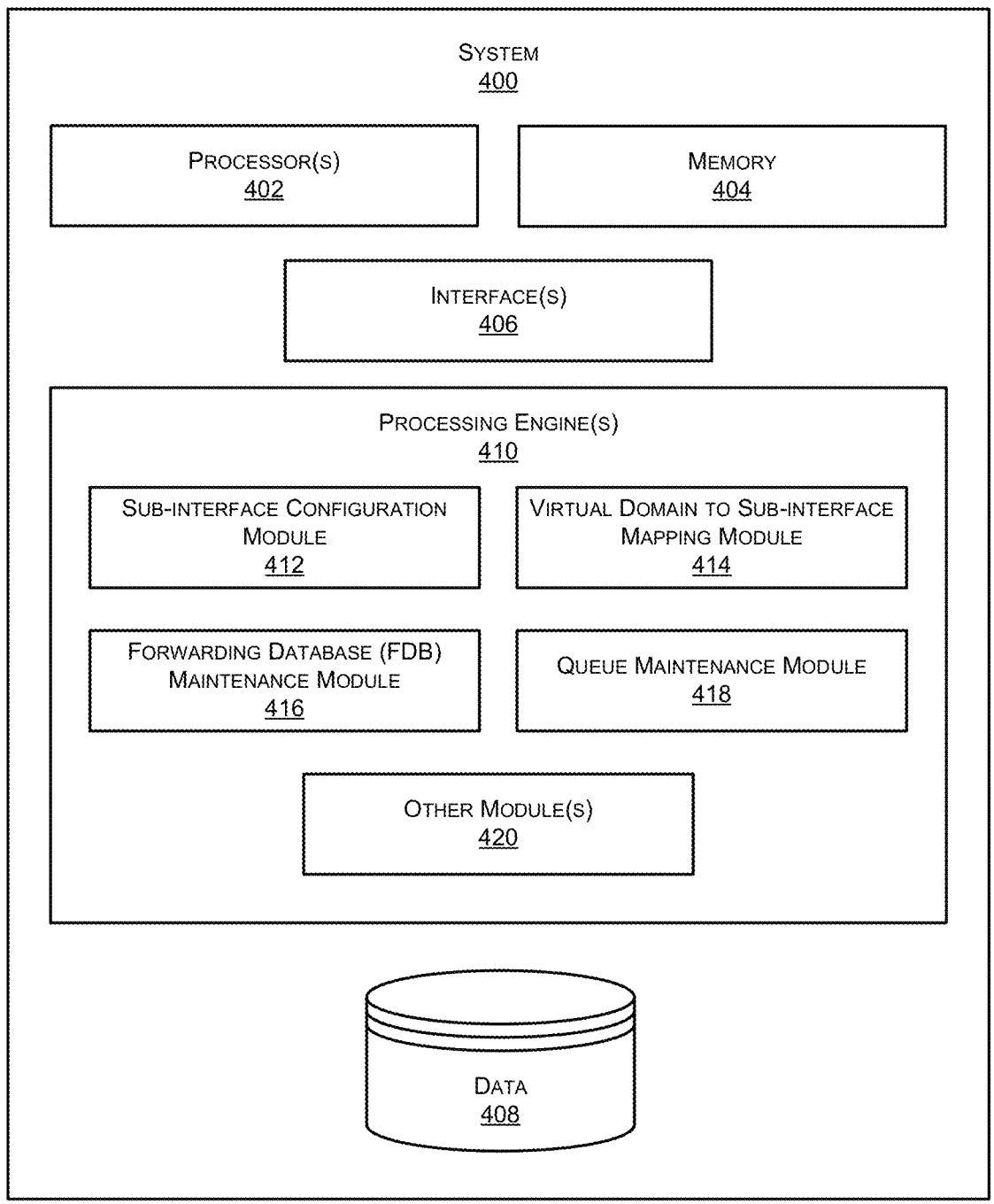
FIG. 4 is a module diagram illustrating functional units of a system to enable communication between one or more virtual domains and an external network device in accordance with an embodiment of the present invention.

In the context of the present example, an improved VLAN architecture uses a MAC-VLAN switch 308 for providing a means to connect with external network devices that can overcome the above-mentioned and other disadvantages associated with the use of TP VDOM 206. According to an aspect, a system 400 (as illustrated in FIG. 4) can allow configuration of sub-interfaces 306 of a parent physical Ethernet interface (as indicated by PORT 1) (which may also be referred to as the parent interface, hereinafter). Each of the configured sub-interfaces 306 can be associated with a unique media access control (MAC) address and consequently a unique Internet Protocol (IP) address. Applications (e.g., network security functionality, including, but not limited to a firewall) running within VDOMs 304 can then bind to a specific sub-interface 306 in order to connect directly to the physical network of virtualized network security device 302 using the respective unique MAC address and IP address. Further, the improved VLAN architecture can utilize techniques to mitigate effects of source-MAC flooding attacks on an FDB (not shown) that maps MAC addresses to the sub-interfaces 306 of the physical Ethernet interface.

Although embodiments of the present disclosure have been described using a virtualized network security device 302, it should be appreciated that the same has been done merely to illustrate the invention in an exemplary manner and implementation of system 400 using any other network device or computing device, is well within the scope of the present disclosure. A detailed explanation of system 400 is further provided with reference to FIG. 4.

FIG. 4 is a module diagram illustrating functional units of a system 400 to enable communication between one or more virtual domains and an external network device in accordance with an embodiment of the present invention.

As illustrated, system 400, which may represent a network security device (e.g., a network gateway 115), can include one or more processor(s) 402. Processor(s) 402 can be implemented as one or more microprocessors, microcomputers, microcontrollers, digital signal processors, central processing units, logic circuitries, and/or any devices that manipulate data based on operational instructions. Among other capabilities, processor(s) 402 are configured to fetch and execute computer-readable instructions stored in a memory 404 of system 400. Memory 404 can store one or more computer-readable instructions or routines, which may be fetched and executed to create or share the data units over a network service. Memory 404 can include any non-transitory storage device including, for example, volatile memory such as RAM, or non-volatile memory such as EPROM, flash memory, and the like. In an example embodiment, memory 404 may be a local memory or may be located remotely, such as a server, a file server, a data server, and the Cloud.

System 400 can also include one or more interface(s) 406. Interface(s) 406 may include a variety of interfaces, for example, interfaces for data input and output devices, referred to as I/O devices, storage devices, and the like. Interface(s) 406 may facilitate communication of system 400 with various devices coupled to system 400. Interface(s) 406 may also provide a communication pathway for one or more components of system 400. Examples of such components include, but are not limited to, processing engine(s) 410 and data 408.

Processing Engine(s) 410 can be implemented as a combination of hardware and software or firmware programming (for example, programmable instructions) to implement one or more functionalities of engine(s) 410. In the examples described herein, such combinations of hardware and software or firmware programming may be implemented in several different ways. For example, the programming for the engine(s) may be processor executable instructions stored on a non-transitory machine-readable storage medium and the hardware for engine(s) 410 may include a processing resource (for example, one or more processors), to execute such instructions. In the examples, the machine-readable storage medium may store instructions that, when executed by the processing resource, implement engine(s) 410. In such examples, system 400 can include the machine-readable storage medium storing the instructions and the processing resource to execute the instructions, or the machine-readable storage medium may be separate but accessible to system 400 and the processing resource. In other examples, processing engine(s) 410 may be implemented by electronic circuitry. Data 408 can include data that is either stored or generated as a result of functionalities implemented by any of the components of processing engine(s) 410.

In an example, processing engine(s) 410 can include a sub-interface configuration module 412, a virtual domain to sub-interface mapping module 414, a forwarding database (FDB) maintenance module 416, a queue maintenance module 418 and other module(s) 420. Other module(s) 420 can implement functionalities that supplement applications or functions performed by system 400 or processing engine(s) 410.

In an aspect, sub-interface configuration module 412 can configure sub-interfaces of a parent physical Ethernet interface (which may be referred to as a parent interface, hereinafter). Those skilled in the art will appreciate that sub-interfaces are virtual interfaces that can be created by dividing the parent interface into multiple logical interfaces and can be used for sending and receiving data. Parent interface can be an interface such as an aggregate interface, a Virtual Local Area Network (VLAN) interface, etc. Examples of parent interface can also include a network interface card, a network adapter, a LAN adapter, and the like. Further, the sub-interfaces are configured with an Internet Protocol (IP) address.

In an embodiment, sub-interface configuration module 412 can further maintain a count of the number of sub-interfaces that are created for each parent interface, where the maximum number of sub interfaces that may be created for a parent interface can be limited. The sub-interface can be created using a sub-interface object that can be associated with an object of the parent interface. The count of the number of sub-interfaces can be maintained using a "count" field in the object associated with the parent interface, which is further explained with reference to FIG. 5A. The count can be incremented when a sub-interface is created and the count can be decremented when a sub-interface is deleted. Also, when a sub-interface is deleted, the object of the sub-interface can be freed and when all sub-interfaces are deleted, for a particular parent interface (i.e., when the count is zero), the object of the parent interface can be freed.

Those skilled in the art will appreciate that certain applications, such as legacy applications or applications that monitor network traffic or applications that perform network security functions, are directly connected to a physical network. Thus, each sub-interface can be assigned a MAC address, thereby making the sub-interface appear as a physical interface that can be directly connected to the physical network. Therefore, in an embodiment, each sub-interface can be associated with a unique MAC address that can be generated based on a MAC address of the parent interface. For generation of the unique MAC address each sub-interface can be allocated a unique sub-interface identifier. When a sub-interface is created, a "bitmap" field can be used to allocate the smallest non-negative available integer to a sub-interface as a corresponding unique identifier that can be further used in connection with generating the unique MAC address for the sub-interface based on the MAC address of the parent interface as described further below.

Further, each virtual domain or a VDOM can provide separate security domains that can allow separate zones, user authentication, firewall policies, routing and Virtual Private Network (VPN) configurations. In an aspect, a virtual domain to sub-interface mapping module 414, can map an application (e.g., a firewall) within a VDOM to a specific sub-interface of the configured sub-interfaces of the parent interface. Such a technique can enable the application to communicate with external network devices.

In an embodiment, forwarding database (FDB) maintenance module 416 can maintain a forwarding database (FDB) within kernel space of the network security operating system of the network security device to store a mapping between the application configured on the VDOM to its corresponding sub-interface by automatically learning attributes of packets communicated between the application and the external network device via the sub-interface and storing the learned attributes in the FDB. For example, a source MAC address of the packet can be stored in the FDB and associated with the sub-interface through which the packet is being forwarded. Further, the FDB can also store and maintain parameters pertaining to the sub-interfaces and, their respective association with the parent interface and their respective association with a particular VDOM. For example, the FDB can store the MAC address of a sub-interface and the MAC address of the associated parent interface.

In an embodiment, forwarding database (FDB) maintenance module 416 can perform learning of the attributes of the sub-interface when the network security device is operating in transparent mode. During operation in transparent mode, at least one FDB entry can store information mapping a source MAC address of pass-through traffic and the sub-interface on which the pass-through traffic is received. Also, before storing entries in the FDB, the entries can be hashed by the MAC address of the respective sub-interface such that the entry can be stored in a forwarding hash table.

According to an embodiment, when a VDOM is operating in transparent mode and an ingress packet that is to be processed by the application is received by an internal switch running on the virtualized network device via the sub-interface, FDB maintenance module 416 and queue maintenance module 418 can be implemented to mitigate against a source-MAC flooding attack.

In an embodiment, FDB maintenance module 416 can perform source-MAC learning while mitigating against a source-MAC flooding attack. In order to mitigate the source-MAC flooding attack, FDB maintenance module 416 can determine whether an entry having a MAC address corresponding to a source MAC address of the ingress packet that is received by the internal switch exists in the FDB. When the corresponding entry does not exist in the FDB, the FDB maintenance module 416 can create an entry in a similar manner as described above, i.e., by learning the association between the source MAC address and the sub-interface, and creating and storing the entry containing the source MAC address and information regarding the sub-interface.

According to one embodiment, source-MAC flooding attack mitigation involves the use of an ephemeral queue for each parent interface so store FDB records that have yet to be confirmed. The ephemeral queues are maintained by queue maintenance module 418. When FDB maintenance module 416 creates an entry in the FDB or stores an entry in an FDB hash table, queue maintenance module 418 can queue the entry for confirmation on the tail of the ephemeral queue that is associated with the associated parent interface. Entries of the ephemeral queue can await confirmation and responsive to being confirmed the entries can be unlinked from the ephemeral queue while the corresponding entry can be retained in the FDB. An entry can be considered as a confirmed entry when a packet is received on another interface having a destination MAC address matching the MAC address of an entry awaiting confirmation in the ephemeral queue.

In an embodiment, when queue maintenance module 418 observes a packet having a destination MAC address matching the MAC address of an entry awaiting confirmation in the ephemeral queue, then queue maintenance module 418 can recognize the entry awaiting confirmation as a confirmed entry. Confirmed entries are retained in the FDB and unlinked from the ephemeral queue by queue maintenance module 418.

Those skilled in the art will appreciate during a source-MAC flooding attack, a number of junk FDB entries and ephemeral queue entries may be created because these entries will not be confirmed as there is no communication taking place with these MAC addresses. Thus, the FDB entries contained in the FDB may reach a pre-determined threshold representing an upper limit of entries that the FDB can store. In order to mitigate against adverse affects of a source-MAC flooding attack, in an embodiment, when the total number of entries contained in the FDB reaches the predetermined threshold, queue maintenance module 418 can obsolete an unconfirmed entry at the head of the ephemeral queue. The entry at the head of the ephemeral queue is selected to be obsoleted because it has remained in the ephemeral queue without being confirmed for longer than all other entries in the ephemeral queue. Additionally, FDB maintenance module 416 can remove the corresponding unconfirmed entry from the FDB, thereby freeing space for legitimate FDB entires.

In an embodiment, FDB maintenance module 416 can periodically obsolete stale entries in the FDB. For example, a timer can be incorporated such that in response to expiration of the timer, entries from the FDB that have not been used for a predetermined amount of time can be considered as obsolete. Further details regarding FDB maintenance module 416 and queue maintenance module 219 is provided below with reference to FIGS. 7A-B, 8A-B and 9A-C.

FIGS. 5A, 5B and 5C are code fragments 500, 530 and 550 respectively, illustrating exemplary implementation details relating to sub-interface creation in accordance with an embodiment of the present invention.

In an embodiment, the parent interface which can be a physical interface, an aggregate interface, or a VLAN interface, can have zero or more associated sub-interfaces. An object of the type "macvlan_port" can be allocated and associated with the parent interface as illustrated in FIG. 5A. In the "macvlan_port" object, the "count" field is used to maintain a count of the number of sub-interfaces that currently exist for the parent interface. The maximum number of sub-interfaces that can be created for a parent physical interface can be limited by a predefined "MACVLAN_MAX_NUM" value. In the context of the present example, "MACVLAN_MAX_NUM" set to 512. In an embodiment, when a sub-interface for a particular parent interface is deleted, the "count" field within the macvlan_port object for the particular parent interface can be decreased by one, such that when all sub-interfaces of the parent interface are deleted, the "macvlan_port" object of the physical interface can be freed. Thus, when the "count" field becomes zero, the "macvlan_port" object can be freed. Also a "bitmap" field can be used to allocate the smallest non-negative available integer to a sub-interface as a unique identifier for that sub-interface. As sub-interfaces are created and deleted for a particular physical interface, the bitmap can be updated to reflect the unavailability/availability of the unique identifier for use. Furthermore, fields "macvlan_mac_lock", "mac_num", "mac_hash", and "mac_gc_timer" can be used to maintain FDB by FDB maintenance module 416.

In an embodiment, the parent interface can have an associated ephemeral queue that is maintained by queue maintenance module 418. Thus, "macvlan_port" object associated with the parent interface as illustrated in FIG. 5B can include "mac_ephemeral_list" field that pertains to ephemeral queue of the parent interface. Further, "mac_hash" field can pertain to a hash table such that every FDB entry can be linked in the hash table with MAC address of the respective sub-interface. In context of the present example, "mac_num" field can indicate total number of currently existing FDB entries in the hash table and "mac_gc_timer" field can indicate a timer, which can run periodically to obsolete the stale FDB entries.

When a sub-interface is created for an interface, an object type "macvlan_dev" can be created, as illustrated in FIG. 5C and associated with the "macvlan_port" object for that interface. The "macvlan_dev" object can be allocated as private information of corresponding net device. The "macvlan_dev" object can be assigned the smallest non-negative available interface as a unique identifier, which can be saved in "macvlan_id" field. Further, if the sub-interface is going to work in a transparent VDOM, the field "learn_mac" can be set to 1.

Figure 6:
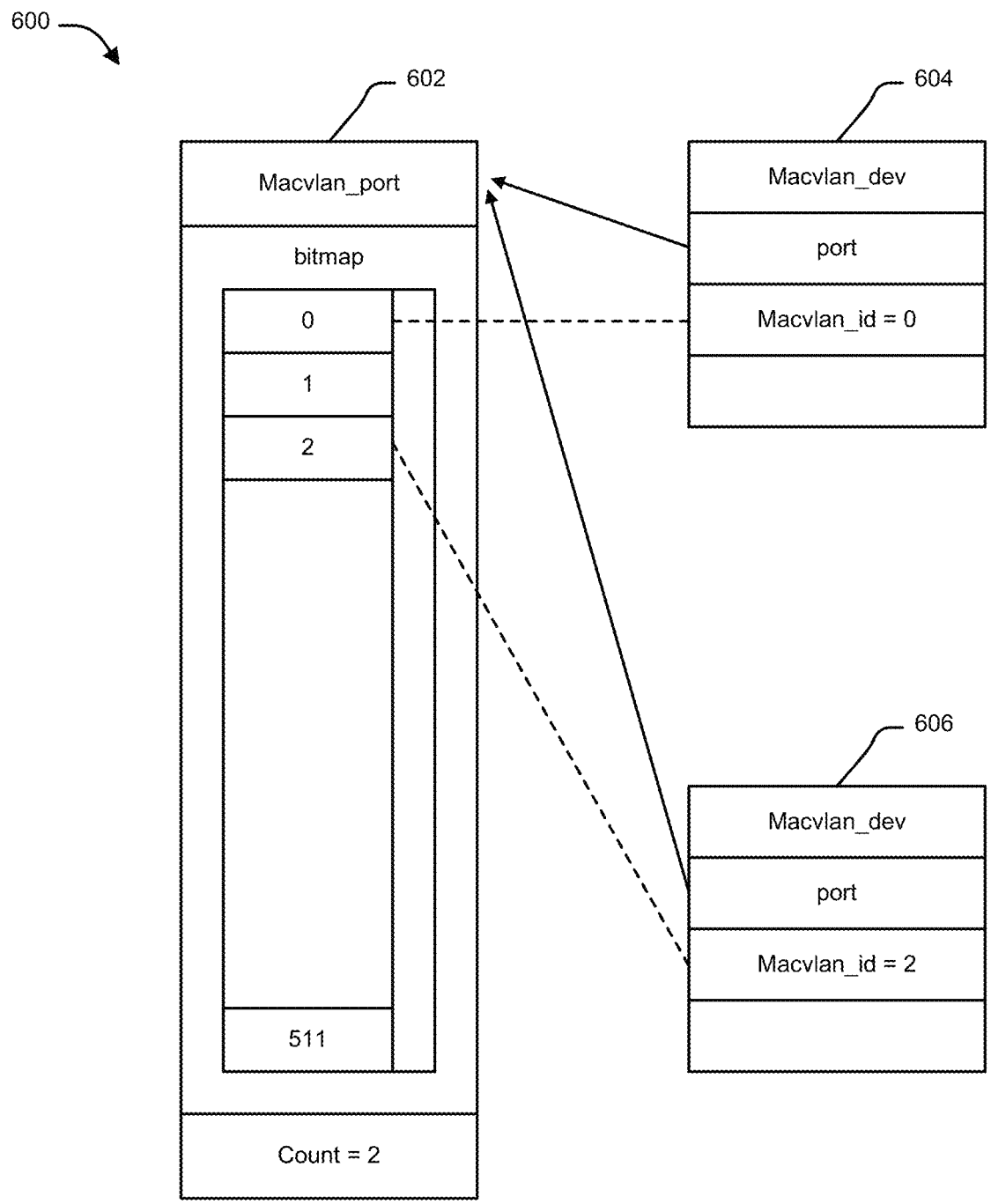
FIG. 6 is a block diagram illustrating relationship between ports and instantiated objects of one or more sub-interfaces in accordance with an embodiment of the present invention.

FIG. 6 is a block diagram 600 illustrating relationship between ports and instantiated objects of one or more sub-interfaces in accordance with an embodiment of the present invention.

As illustrated in FIG. 6, the "bitmap" field of a macvlan_port object 602 of the parent interface is used to provide a unique identifier "macvlan_id" to objects of sub-interfaces 604 and 606. Sub-interfaces 604 and 606 also include port information of the parent interface 602 with which they are associated.

In an embodiment, during creation of a sub-interface, system 400 can return an error if the name of the sub-interface is already in use. System 400 can allocate an object of type "macvlan_port" if no sub-interface currently exists for the parent physical interface (the lower interface) and a first sub-interface is required to be created. System 400 can also return an error when the total number of such sub-interfaces of the parent physical interface has already reached the upper limit. During creation of the sub-interface, system 400 can allocate the smallest non-negative identifier available in the bitmap field to the "macvlan_id" of the sub-interface as described below:

vlan→macvlan_id=find_first_zero_bit (port→bitmap, MACVLAN_MAX_NUM)

While various other approaches may be used to generate a unique MAC address for a new EMACVLAN sub-interface based on the parent interface's MAC address and the unique ID of the EMACVLAN sub-interface, an exemplary technique for generation of a unique 6-byte MAC address for the sub-interface is as follows:

new_mac[0]=lower_mac[0]|0x02; /*set local assignment bit (IEEE802)*/new
new_mac[0]=lower_mac[0]+((vlan→macvlan_id+ 1)<<2);
new_mac[1]=lower_mac[1]+((vlan→macvlan_id+ 1)>>6);
new_mac[2]=lower_mac[2]
new_mac[3]=lower_mac[3];
new_mac[4]=lower_mac[4];
new_mac[5]=lower_mac[5];

In the above example, the lower_mac byte array represents the MAC address of the parent interface and, upon completion; the new_mac byte array contains the newly generated unique MAC address for the sub-interface based on both the unique ID of the sub-interface and the MAC address of the parent interface. Once the sub-interface has been created, the sub-interface can be registered and linked into the list of sub-interfaces of the parent interface.

FIGS. 7A and 7B are code fragments 700 and 750 respectively, illustrating exemplary data structures for an FDB entry in accordance with an embodiment of the present invention.

As noted above, in embodiments of the present invention, zero or more sub-interfaces can be created for the same underlying interface of a network security device, with each sub-interface having its own unique MAC address. When the network security operating system of the network security device is operating in transparent mode, a forwarding database (FDB) is maintained in kernel space of the network security operating system to cache various learned source MAC addresses for the sub-interfaces when traffic passes through the sub-interfaces. This allows the FDB to be used by the network security device to make traffic forwarding decisions regarding on which sub-interface traffic received on the parent interface should be forwarded.

In the context of the example as illustrated in FIG. 7A, each FDB entry is represented by an object of type "macvlan_fdb_entry", which includes a "mac_type" field that can be "dynamic", "static", or "local". When value of the "mac_type" field is "dynamic", it means the FDB entry was learned based on observed traffic; when the value of the "mac_type" field is "static", it means the FDB entry was set from user-space; and when the value of the "mac_type" field is "local", it means that the MAC address belongs to a corresponding sub-interface. FDB entries can be hashed by the MAC address of the respective sub-interface such that searching of the requisite entry can be performed more efficiently. In one embodiment, "local" entries can have the highest priority and "dynamic" entries have the lowest priority.

In context of the example illustrated in FIG. 7B, the "macvlan_fdb_entry" object can include "eph_link", which represents a link node that can be linked into the ephemeral queue of the parent interface when the FDB contains entries that are awaiting confirmation in the ephemeral queue. Further, "hash_link" represents a link node that is linked into one of the slots of the FDB hash table. Further, "macdev" has the information of the EMACVLAN sub-interface which a host with "mac_addr" can connect to.

Figure 8A:
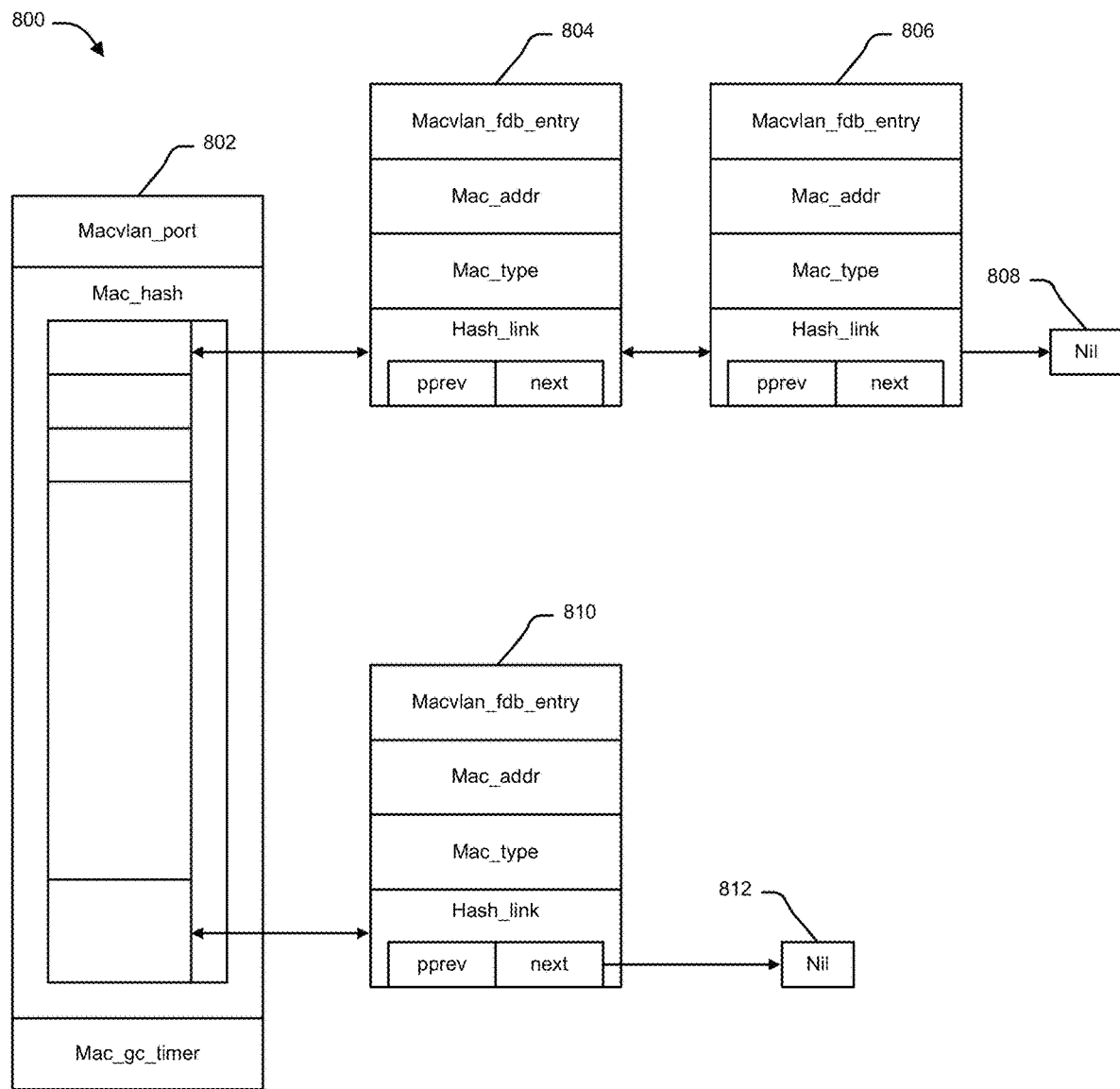
FIGS. 8A-B are block diagrams conceptually illustrating how entries of a forwarding database are created and managed in accordance with an embodiment of the present invention.
Figure 8B:
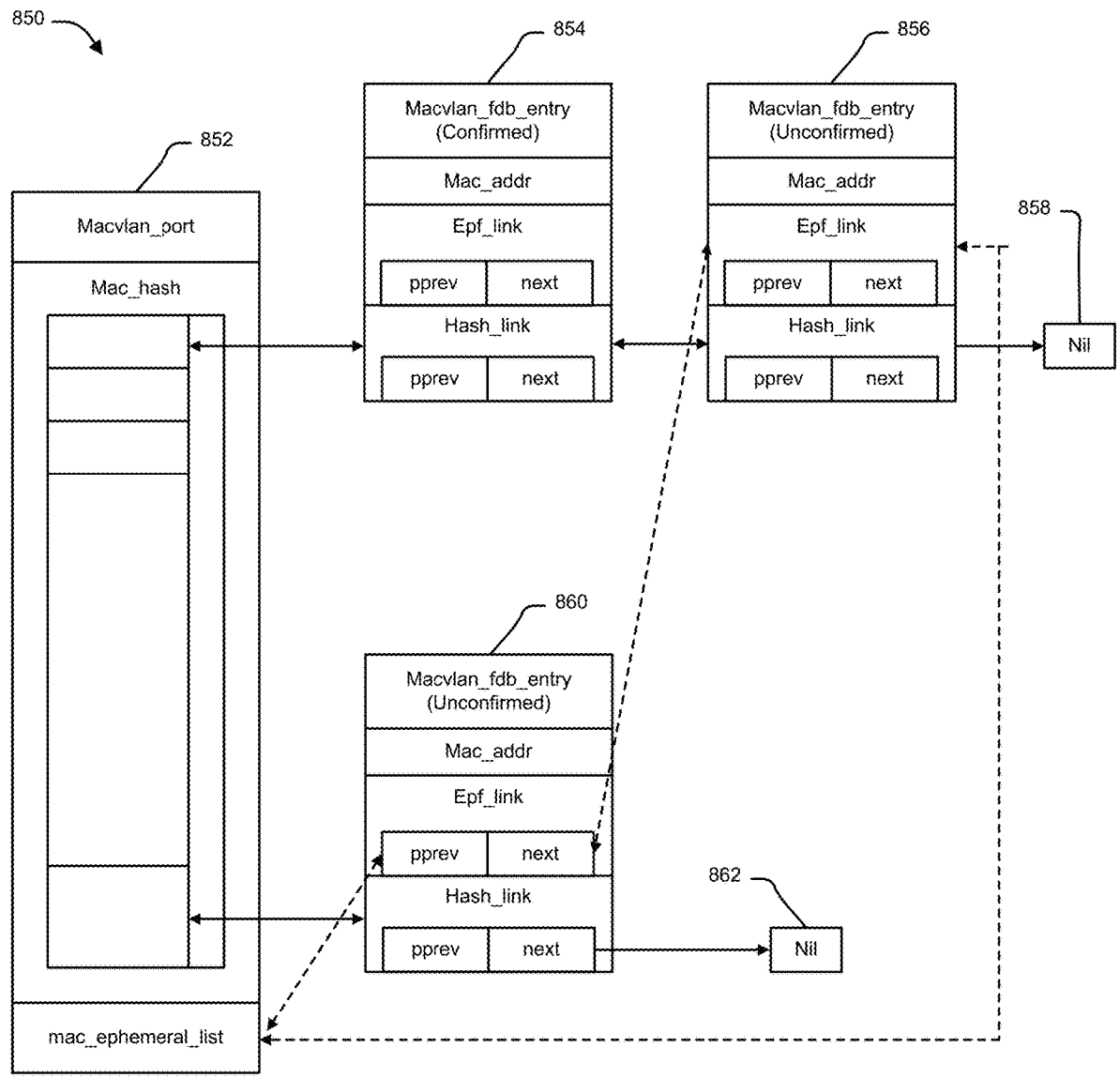

FIGS. 8A-B are block diagrams conceptually illustrating how entries of a forwarding database are created and managed in accordance with an embodiment of the present invention.

Referring to FIG. 7A and FIG. 8A, in an object associated with the parent interface, i.e., "macvlan_port", object 802, fields "mac_hash" and "mac_gc_timer" can be used to maintain FDB by the FDB maintenance module 416. When a packet passes through a sub-interface, an FDB entry can be created or updated with the source MAC address of the packet and information identifying the sub-interface. The entries in the FDB can be hashed by the MAC address of the respective sub-interface. When a packet is received on a physical interface having one or more sub-interfaces, the FDB can be used to determine on which sub-interface to forward the packet by performing a look up against the FDB with the destination MAC address of the packet. If a FDB entry is found, the "last used" field can be updated to reflect the current time. Further, a timer function can run periodically to remove old FDB entries that have not been used for a predetermined and/or configurable time period (e.g., MACVLAN_FDB_TIMEOUT). In an example, MACVLAN_FDB_TIMEOUT can be set to 1 hour.

Further, referring to FIG. 8B, the "macvlan_port" object 852 can have an associated ephemeral list represented by "mac_emphemeral_list" that is maintained by queue maintenance module 418. The FDB or the FDB hash table includes confirmed entries (e.g., FDB entry 854) and entries that are awaiting confirmation (e.g., FDB entries 856 and 860) however, the confirmed entries are unlinked from the ephemeral queue. Further, the "macvlan_fdb_entry" object associated with an FDB entry includes "eph_link", which represents a link node that can be linked into the ephemeral queue of the parent interface that is "mac_emphemeral_list". Furthermore, the "macvlan_fdb_entry" object includes "hash_link" representing a link node which is linked into one of the slot of the FDB hash table of the "macvlan_port" object 852.

Figure 9A:
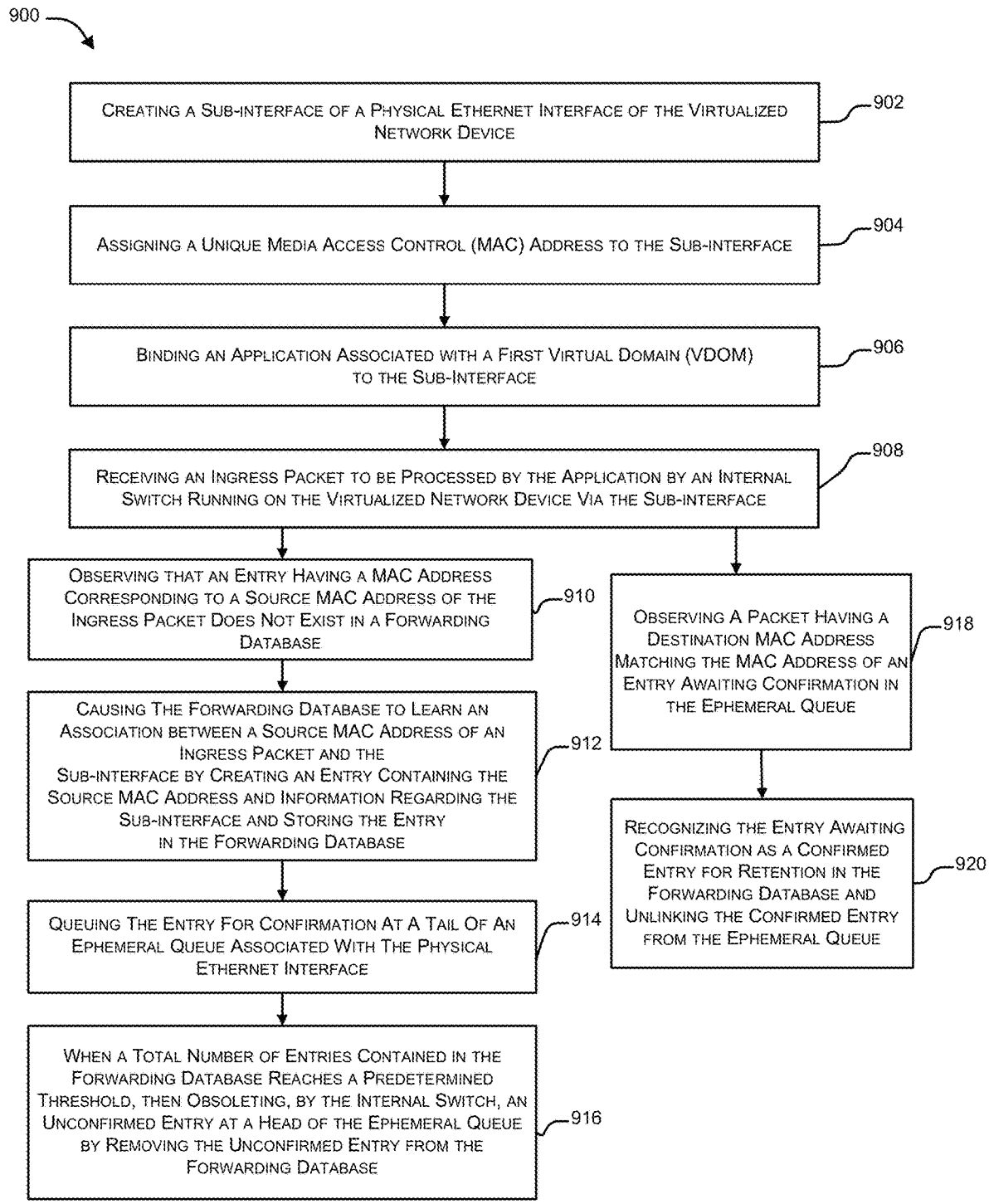
FIG. 9A is a high-level flow diagram illustrating configuration of the sub-interfaces for facilitating communication between an application associated with a virtual domain and an external network device with an ability to mitigate against source-MAC flooding attacks in accordance with an embodiment of the present invention.

FIG. 9A is a high-level flow diagram illustrating configuration of the sub-interfaces for facilitating communication between an application associated with a virtual domain and an external network device with an ability to mitigate against source-MAC flooding attacks in accordance with an embodiment of the present invention.

In the context of the present example, at block 902, a virtualized network device creates one or more sub-interfaces associated with a physical Ethernet interface (parent interface) of the virtualized network device to facilitate communication between an application associated with a first VDOM of the virtualized network device and an external network device.

At block 904, the one or more sub-interfaces of a parent interface are each assigned a unique MAC address based on the locally unique ID of the sub-interface and the MAC address of the parent interface as described above.

At block 906, the application (e.g., performing one or more security functions) configured on a first VDOM can be mapped (bound) to a first sub-interface.

Figure 9B:
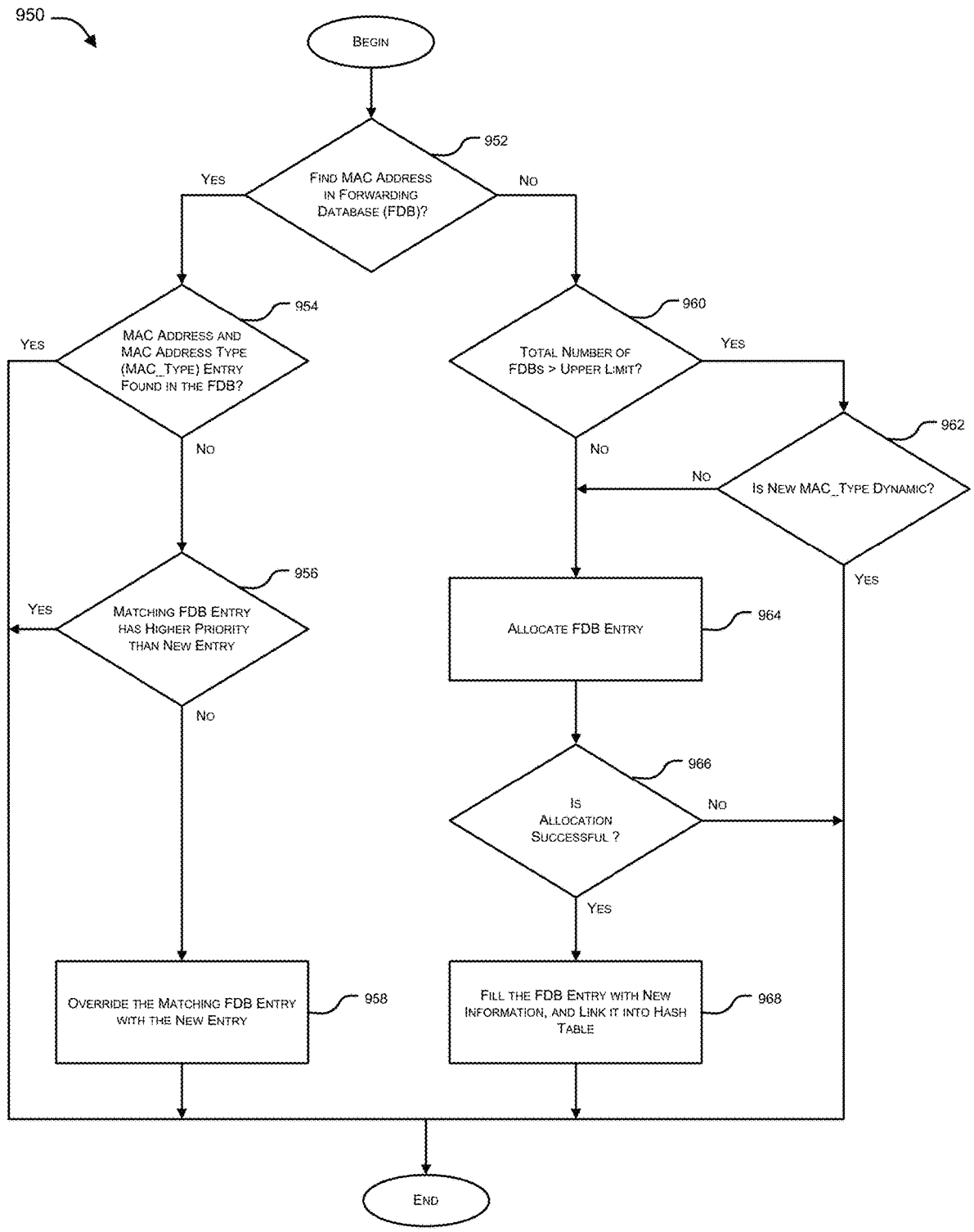
FIG. 9B is a high-level flow diagram illustrating creation and use of a sub-interface in accordance with an embodiment of the present invention.

Those skilled in the art will appreciate that FDB learning is performed to allow reply traffic to be directed to the application when the VDOM is operating in transparent mode For example, when the internal MAC-VLAN switch of the network security device receives a packet via a sub-interface it may create or update an FDB entry within an FDB maintained in kernel space of the network security operating system of the network security device to create an association between the source MAC address of the packet and the sub-interface as described further below with reference to FIG. 9B. In this manner, reply traffic will be properly forwarded through the first VDOM and processed by the application on the reverse path. The internal MAC-VLAN switch running on the virtualized network device can identify the sub-interface to which the reply traffic is to be forwarded by performing a lookup in the FDB based on the destination MAC address contained in the reply traffic such that the reply traffic is forwarded to the application via the sub-interface based on an FDB entry found by the FDB lookup.

At block 908, when the first VDOM is operating in transparent mode, an ingress packet to be processed by the application is received by an internal switch running on the virtualized network device via the sub-interface.

In context of the present example, source-MAC learning can be performed while mitigating against a source-MAC flooding attack. At block 910, an FDB lookup is performed and it is observed that an entry having a MAC address corresponding to source MAC address of the ingress packet does not exist in the FBD.

At block 912, the FDB of the virtualized network device can learn an association between the source MAC address and the sub-interface by creating the entry containing the source MAC address and information regarding the sub-interface and storing the entry in the FDB. Additionally, at block 914, the entry can be queued at the tail of the ephemeral queue associated with the physical Ethernet interface for confirmation.

At block 916, when total number of entries contained in the FDB reaches a predetermined/configurable threshold an unconfirmed entry can be removed from the FDB. In one embodiment, the oldest unconfirmed entry (e.g., the entry awaiting confirmation at the head of the ephemeral queue) is the one removed form the FDB. In this manner, use of the ephemeral queue to confirm FDB entries facilitates removal of junk entries that may have been added to the FDB during a source-MAC flooding attack, thereby freeing space in the FDB for legitimate entries and avoiding traffic flow disruption during a source-MAC flooding attack.

At block 918, the internal switch observes a packet as having a destination MAC address matching the MAC address of an entry awaiting confirmation in the ephemeral queue. Therefore, at block 920, the entry can be recognized as a confirmed entry to be retained in the FDB and unlinked from the ephemeral queue. Thus, the FDB entries, which are confirmed remain in the FDB while the unconfirmed entries are deleted/removed as necessary to keep the FDB within the predetermined/configurable threshold.

FIG. 9B is a high-level flow diagram 950 illustrating creation and use of a sub-interface in accordance with an embodiment of the present invention.

In the context of the present example, responsive to receipt of an egress packet by the internal MAC-VLAN switch via a sub-interface, FDB insertion processing may be performed (e.g., by invoking FDB maintenance module 416 with information identifying the VLAN at issue, the source MAC address of the packet and the MAC address type). At decision block 952, an FDB lookup is performed against the FDB based on the MAC address. If the lookup finds a matching FDB entry, then an FDB entry associating this MAC address with a sub-interface already exists in the FDB. When a matching FDB entry is found, then processing continues with decision block 954; otherwise, if no matching FDB entry is found, then processing branches to decision block 960.

At decision block 954, it is further determined whether the VLAN and the MAC address type (e.g., the "mac_type" field) match the FDB entry found in decision block 952. When these attributes are the same, the processing is complete and no changes need to be made to the FDB entry; otherwise, processing continues with decision block 956. At decision block 956, it is determined whether the found FDB entry has a higher priority than that of the FDB entry attempting to be added pertaining to the received MAC address. If the found FDB entry has a lower priority, the FDB entry can be overridden by the new entry at block 958; otherwise, processing is complete.

When the source MAC address of the packet is not found in the FDB at decision block 952, then, at decision block 960, new FDB entry creation processing begins by determining whether the current number of learned FDB entries is greater than the upper limit of learned FDB entries allowed. If so, then processing branches to decision block 962; otherwise processing continues with block 964.

At decision block 962, it is determined whether the MAC address type (e.g., the "mac_type" field) for the new entry is dynamic. If so, then processing is complete as no further learned FDB entries are permitted; otherwise, since, this is not a learned FDB entry, processing continues with block 964.

At block 964, an FDB entry is allocated. At decision block 966, it is determined whether the allocation was successful at 966. If so, then processing continues with block 968; otherwise, processing is complete and no new FDB entry is created.

At block 968, the newly allocated FDB entry is filled with the new information and linked to the hash table (e.g., mac_hash of macvlan_port object 802 of FIG. 8).

Figure 9C:
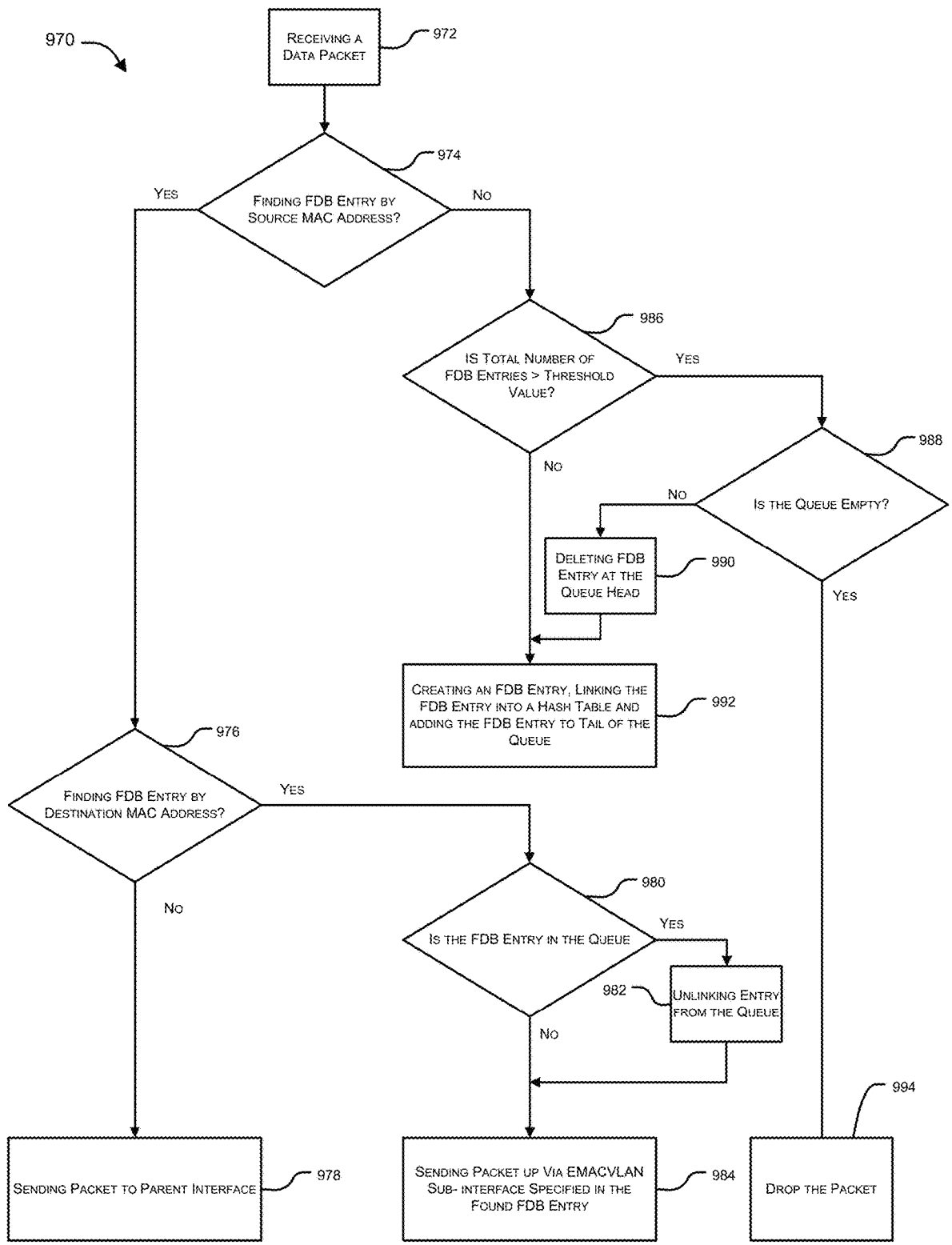
FIG. 9C is a high-level flow diagram illustrating the use of an ephemeral queue to mitigate effects of source-MAC flooding attacks by confirming and obsoleting forwarding database entries as appropriate in accordance with an embodiment of the present invention.

FIG. 9C is a high-level flow diagram illustrating the use of an ephemeral queue to mitigate effects of source-MAC flooding attacks by confirming and obsoleting FDB entries as appropriate in accordance with an embodiment of the present invention.

In context of the present example, at block 972, a data packet is received by an internal switch running on the virtualized network device via the sub-interface. At decision block 974, an FDB lookup is performed based on source MAC address of the data packet. If an entry, having a MAC address corresponding to source MAC address of the data packet, does not exist in the FDB, the processing continues with decision block 986, otherwise the processing continues at block 976.

At decision block 986, it is determined if the number of FDB entries are greater than the predetermined threshold. At block 992, if the number of FDB entries are not greater than the pre-determined threshold, then the entry is created in the FDB and a corresponding entry is queued in the ephemeral queue. However, at decision block 986, if the number of FDB entries is greater than the predetermined threshold, then the process continues at decision block 988. At decision block 988, it is determined whether the ephemeral queue is empty. If the ephemeral queue is empty, at block 994, the packet is dropped. However, at block 990, if the queue is not empty the FDB entry at the head of the queue is unlinked from the ephemeral queue and is deleted from the FDB, such that, at block 992 the entry can be created and linked to the ephemeral queue. In an embodiment, the FDB entry can be created according to the process of FIG. 9B.

At block 976, an FDB lookup is performed based on destination MAC address of the data packet. If the corresponding entry is not found, at block 978, the packet is sent to the parent interface, otherwise the processing continues at decision block 980. At decision block 980, it is determined if the FDB entry is in the ephemeral queue. If the entry is in ephemeral queue, it means the entry is confirmed, therefore, at block 982, the entry is unlinked from the queue but is retained in the FDB. If the FDB entry is not in the queue or after unlinking the FDB entry, at block 984, the packet is sent via EMACLAN sub-interface specified in the found FDB entry.

Figure 10:
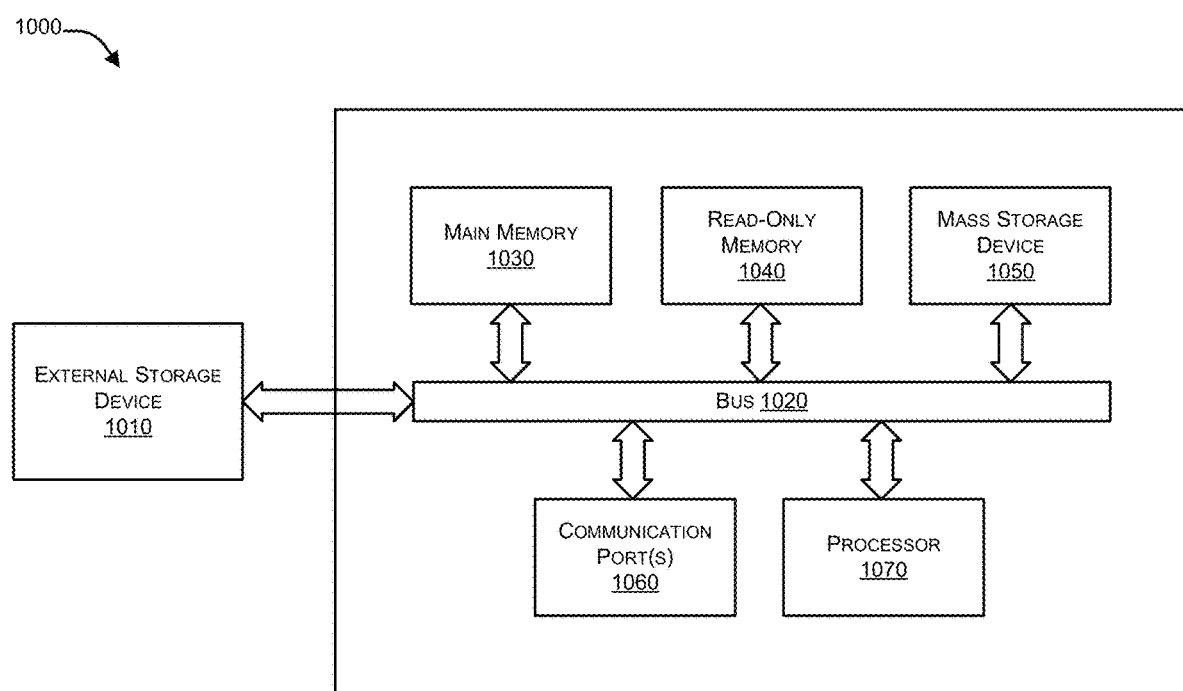
FIG. 10 illustrates an exemplary computer system in which or with which embodiments of the present invention may be utilized.

FIG. 10 illustrates an exemplary computer system 1000 in which or with which embodiments of the present invention may be utilized. Computer system 1000 may represent a portion of a network security device (e.g., network security device 150 or 302), a network gateway (e.g., one of network gateways 115) or system 400.

As shown in FIG. 10, computer system 1000 includes an external storage device 1010, a bus 1020, a main memory 1030, a read only memory 1040, a mass storage device 1050, communication port 1060, and a processor 1070. Computer system may represent some portion of a network security device (e.g., network security device 150 or 302, network gateway 115) or system 400.

Those skilled in the art will appreciate that computer system 1000 may include more than one processor 1070 and communication ports 1060. Examples of processor 1070 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 1070 may include various modules associated with embodiments of the present invention.

Communication port 1060 can be any of an RS-232 port for use with a modem based dialup connection, a 10/100 Ethernet port, a Gigabit or 10 Gigabit port using copper or fiber, a serial port, a parallel port, or other existing or future ports. Communication port 1060 may be chosen depending on a network, such a Local Area Network (LAN), Wide Area Network (WAN), or any network to which computer system connects.

Memory 1030 can be Random Access Memory (RAM), or any other dynamic storage device commonly known in the art. Read only memory 1040 can be any static storage device(s) e.g., but not limited to, a Programmable Read Only Memory (PROM) chips for storing static information e.g. start-up or BIOS instructions for processor 1070.

Mass storage 1050 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 1020 communicatively couples processor(s) 1070 with the other memory, storage and communication blocks. Bus 1020 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 1070 to software system.

Optionally, operator and administrative interfaces, e.g. a display, keyboard, and a cursor control device, may also be coupled to bus 1020 to support direct operator interaction with computer system. Other operator and administrative interfaces can be provided through network connections connected through communication port 1060. External storage device 1010 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:

facilitating, by a virtualized network device, communication between an application associated with a first virtual domain (VDOM) of the virtualized network device and an external network device by:

creating a sub-interface of a physical Ethernet interface of the virtualized network device;

assigning a unique Media Access Control (MAC) address to the sub-interface; and binding the application to the sub-interface;

when the first VDOM is operating in transparent mode and an ingress packet to be processed by the application is received by an internal switch running on the virtualized network device via the sub-interface, then performing source-MAC learning while mitigating against a source-MAC flooding attack by:

when an entry, having a MAC address corresponding to a source MAC address of the ingress packet, does not exist in a forwarding database of the virtualized network device:

causing, by the internal switch, the forwarding database of the virtualized network device to learn an association between the source MAC address and the sub-interface by creating the entry containing the source MAC address and information regarding the sub-interface and storing the entry in the forwarding database;

queuing, by the internal switch, the entry for confirmation at a tail of an ephemeral queue associated with the physical Ethernet interface; and when a total number of entries contained in the forwarding database reaches a predetermined threshold, then obsoleting, by the internal switch, an unconfirmed entry at a head of the ephemeral queue by removing the unconfirmed entry from the forwarding database; and when a packet is observed, by the internal switch, having a destination MAC address matching the MAC address of an entry awaiting confirmation in the ephemeral queue, then recognizing the entry awaiting confirmation as a confirmed entry for retention in the forwarding database and unlinking the confirmed entry from the ephemeral queue.

2. The method of claim 1, wherein said storing the entry in the forwarding database comprises hashing the entry by the unique MAC address of the sub-interface and storing the entry in a forwarding hash table.

3. The method of claim 1, further comprising periodically obsoleting stale entries in the forwarding database by responsive to expiration of a timer, removing entries, if any, from the forwarding database that have not been used for a predetermined amount of time.

4. The method of claim 1, wherein said assigning the unique MAC address to the sub-interface comprises generating the unique MAC address based on a MAC address of the physical Ethernet interface and a locally unique identifier of the sub-interface.

5. The method of claim 1, wherein the physical Ethernet interface comprises any or a combination of an aggregate interface and a Virtual Local Area Network (VLAN) interface.

6. The method of claim 1, wherein the application performs a network security function, including one or more of firewalling, web content filtering, antivirus scanning and intrusion prevention.

7. The method of claim 1, wherein the virtualized network device comprises a virtualized network security device, and wherein the forwarding database is maintained within a kernel of a network security operating system of the virtualized network security device.

8. A non-transitory computer-readable storage medium embodying a set of instructions, which when executed by one or more processors of a virtualized network device, causes the one or more processors to perform a method comprising:
   facilitating communication between an application associated with a first virtual domain (VDOM) of the virtualized network device and an external network device by:
      creating a sub-interface of a physical Ethernet interface of the virtualized network device;
      assigning a unique Media Access Control (MAC) address to the sub-interface; and
      binding the application to the sub-interface;
   when the first VDOM is operating in transparent mode and an ingress packet to be processed by the application is received by an internal switch running on the virtualized network device via the sub-interface, then performing source-MAC learning while mitigating against a source-MAC flooding attack by:
      when an entry, having a MAC address corresponding to a source MAC address of the ingress packet, does not exist in a forwarding database of the virtualized network device:
         causing, by the internal switch, the forwarding database of the virtualized network device to learn an association between the source MAC address and the sub-interface by creating the entry containing the source MAC address and information regarding the sub-interface and storing the entry in the forwarding database;
         queuing, by the internal switch, the entry for confirmation at a tail of an ephemeral queue associated with the physical Ethernet interface; and
      when a total number of entries contained in the forwarding database reaches a predetermined threshold, then obsoleting, by the internal switch, an unconfirmed entry at a head of the ephemeral queue by removing the unconfirmed entry from the forwarding database; and
   when a packet is observed, by the internal switch, having a destination MAC address matching the MAC address of an entry awaiting confirmation in the ephemeral queue, then recognizing the entry awaiting confirmation as a confirmed entry for retention in the forwarding database and unlinking the confirmed entry from the ephemeral queue.

9. The non-transitory computer-readable storage medium of claim 8, wherein said storing the entry in the forwarding database comprises hashing the entry by the unique MAC address of the sub-interface and storing the entry in a forwarding hash table.

10. The non-transitory computer-readable storage medium of claim 8, wherein the method further comprises periodically obsoleting stale entries in the forwarding database by responsive to expiration of a timer, removing entries, if any, from the forwarding database that have not been used for a predetermined amount of time.

11. The non-transitory computer-readable storage medium of claim 8, wherein said assigning the unique MAC address to the sub-interface comprises generating the unique MAC address based on a MAC address of the physical Ethernet interface and a locally unique identifier of the sub-interface.

12. The non-transitory computer-readable storage medium of claim 8, wherein the physical Ethernet interface comprises any or a combination of an aggregate interface and a Virtual Local Area Network (VLAN) interface.

13. The non-transitory computer-readable storage medium of claim 8, wherein the application performs a network security function, including one or more of firewalling, web content filtering, antivirus scanning and intrusion prevention.

14. The non-transitory computer-readable storage medium of claim 8, wherein the virtualized network device comprises a virtualized network security device, and wherein the forwarding database is maintained within a kernel of a network security operating system of the virtualized network security device.

* * * * *